United States Patent Office 3,339,999
Patented Sept. 5, 1967

3,339,999
PROCESS FOR VAT DYEING CELLULOSIC
TEXTILE MATERIALS
Arnold Wick, Therwil, Switzerland, assignor to Ciba Limited, Basel, Switzerland, a Swiss company
No Drawing. Filed June 17, 1963, Ser. No. 288,447
Claims priority, application Switzerland, June 19, 1962, 7,384/62
23 Claims. (Cl. 8—34)

The present invention provides new, valuable vat dyestuffs that contain at least one vat-stable phosphoric acid grouping and at least 5 fused rings or at least 2 vattable systems.

The term "vat dyestuffs" includes dyestuffs that contain keto groups and that are capable of conversion by reduction into a so-called leuco form or vat which has better affinity for natural and regenerated cellulose fibers than the non-reduced form, and which can be reconverted by oxidation into the original chromophoric system. As suitable vat dyestuffs there may be mentioned those of the perylene tetracarboxylic acid series, the naphthalene tetracarboxylic acid series, the pyrenequinone series, the benzo series and the naphthoquinone series, indigoid vat dyestuffs and more especially vat dyestuffs of the anthraquinone series, for example, those which contain a 9:10-dioxo-anthracene ring and at least two fused carboxylic or heterocyclic rings, or which consist of a plurality of anthraquinone units. As anthraquinone dyestuffs there may be mentioned more especially those that consist of two or more anthraquinone units that are joined together either directly, or for example, through an —NH— bridge, a —CH=N—N=CH— bridge, an alkylene or arylene diamine bridge or through a dicarboxylic acid radical, or polycarboxylic acid radical or through one or several imidazole, triazole, triazine, cyameluric acid, pyrimidine, quinazoline, oxazole, or oxdiazole or thiazole rings.

As examples of anthraquinone vat dyestuffs there may be mentioned those of the following classes: thiophanthraquinones, anthrapyrimidines, anthrapyridones, isothiazole anthrones, quinazoline anthraquinones, oxazole anthraquinones, thiazole anthraquinones, oxdiazole anthraquinones, anthraquinonyltriazoles, acylamino anthraquinones, pyrazole anthraquinones, dipyrazole anthronyls, pyrazino anthraquinones, hydrazone anthraquinones, azomethine anthraquinones, aza anthraquinones, azabenzanthrone, anthraquinone acridone, indanthrones, thioxanthone anthraquinones, anthrimides, anthrimide carbazoles, dihydro acridines, anthanthrones, pyranthrones, dibenzpyrene quinones, dibenzanthrones, isodibenzanthrones, flavanthrones, acedianthrones, phthaloyl compounds of binuclear and polynuclear hydrocarbons. The term "vat-stable phosphoric acid grouping" refers to those phosphoric acid and thiophosphoric acid groupings that are not split off in an aqueous vat under normal dyeing conditions so that the phosphoric acid grouping is still present in the dyestuff obtained by oxidation of the vat and can be detected, for example, by elementary analysis (phosphorus). Groups that are also considered stable are those phosphoric acid groupings that can be split off under extreme conditions which do not obtain in ordinary vat dyeing processes, or groups of the kind defined that contain a halogen atom bonded to phosphorus or an O-alkyl group which is replaced by an OH group during the vatting process and which is then normally present in the form of an alkali salt.

It is not only those phosphoric acid groupings in which the phosphorus is bound directly to a carbon atom which have proved to be stable. The surprising observation has been made that those groupings in which the phosphorus is bound to a carbon atom of the dyestuff molecule through an oxygen atom are likewise stable. The most important of these groupings are the following, in which F advantageously represents an aromatic nucleus that constitutes a component of the dyestuff molecule and that can be, for example, an external aryl radical, especially a phenyl radical

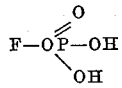

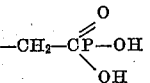

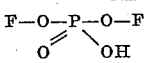

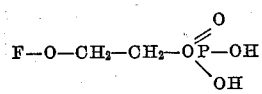

Also stable are groupings of a similar kind having a carbon-phosphorus bond, for example,

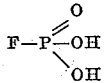

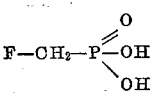

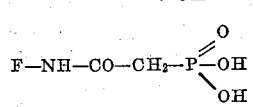

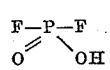

Phosphoric acid groupings that are not vat-stable are those that are bonded to the dyestuff molecule through an —SO$_2$-alkylene-O-bridge or through an —SO$_2$—NH-alkylene-O-bridge In these cases, extensive attack takes place, whereby the phosphoric acid grouping is split off in the vat.

In addition to these substituents, the vat dyestuffs of the invention may also contain the usual substituents, for example, halogen atoms, alkyl and alkoxy groups, acylamino groups, and the like, and also reactive groups (or atoms) which, if necessary, can enter into chemical linkage with one another or with the fiber. Examples of such substituents are primarily sulfato alkyl groups, chlorotriazinylamino groups, chloropropionylamino groups and chloropyrimidine groupings.

The new dyestuffs are obtained by methods in themselves known, for example, by the introduction of a phosphoric acid grouping of the kind defined into vat dyestuffs that contain at least 5 fused rings or at least 2 vattable systems, or into intermediate products that are converted into vat dyestuffs of the kind defined by the introduction of such a group or that are subsequently converted into vat dyestuffs in known manner. Thus, vat dyestuffs can be phosphorized directly, for example, by means of phosphorus pentoxide or by means of polyphosphoric acids, or vat dyestuffs that contain mobile substituents in their molecule, for example, mobile halogen atoms, can be converted into the corresponding phosphorus-containing derivatives by means of metal phosphites (for example, sodium, potassium or ammonium phosphites) or by means of phosphorus acid esters (for example, trialkyl phosphites or triaryl phosphites) by exchanging the mobile substituents. Phosphorus-containing derivatives can likewise be obtained by directly reacting vat dyestuffs with aluminum chloride-phosphorus trichloride mixtures, advantageously at a raised temperature and under superatmospheric pressure and then subjecting them to hydrolysis and oxidation. The vat dyestuffs of the invention can likewise be prepared by directly phosphating vat dyestuffs that contain phosphatable hydroxyl, mercapto or at most secondary amino groups, for example, by means of phosphorus oxychloride, phosphorus oxybromide, otho- and polyphosphoric acid, $P_2O_5$, $PSBr_3$, $P_2S_5$, and the phosphating agents analogous to those described in United States Patent No. 2,183,998, patented Dec. 19, 1939, to James G. McNally et al.

The introduction of phosphoric acid groups into vat dyestuffs in accordance with the invention can also be carried out simultaneously with the manufacture of the dyestuffs by using starting materials that already contain the desired grouping. Thus, valuable hydrophillic vat dyestuffs can be prepared, for example, by acylating amino-anthraquinones with acrylating agents that contain a phosphoric acid group of the kind defined. As acylating agents for use in the said process there may be mentioned, for example, phosphato acetic acid chlorides and more especially phosphato halides of the general formula

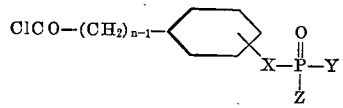

in which $n$ represents an integer of a value not greater than 2, X represents a direct bond or an oxygen atom or an ethylsulfone group or a sulfonic acid N-ethylamide group or an alkyl group or an alkoxy group (having an oxygen atom on one side or on both sides) and Y and Z each represents a halogen atom (especially a chlorine atom) or a substituted or unsubstituted amino group or an HS group or an arylmercapto or alkylmercapto group or an aryloxy or alkyloxy group or more especially a hydroxyl group or an R-O group (R representing a cation). As such compounds there may be mentioned, for example, those of the formulae

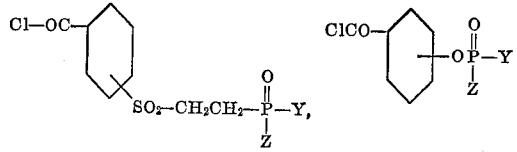

(in which Y and Z have the meanings given above) or especially chloroformylaryl or -aralkylphosphonic acid derivatives, for example, those of the formulae

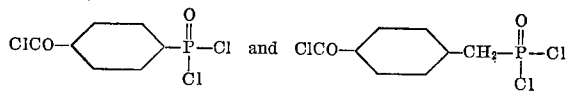

Also suitable as acylating agents are, for example, derivatives of trihalogen triazine, especially of cyanuric chloride, in which one or two of the halogen atoms bound to the cyanuric ring are replaced by a group of the formula

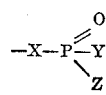

in which X, Y and Z have the meanings given above, which is bound either directly or through an arylamino, aryloxy, arylthio, alkylamino or alkylarylamino bridge.

As such compounds there may be mentioned, for example, those having the following formulae

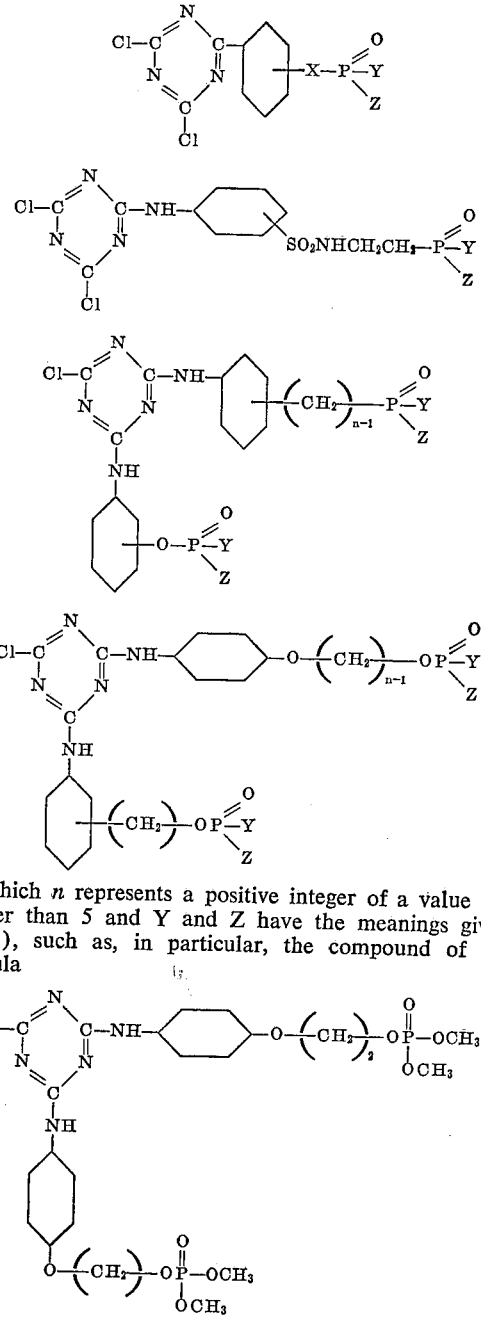

(in which $n$ represents a positive integer of a value not greater than 5 and Y and Z have the meanings given above), such as, in particular, the compound of the formula Dyestuffs whose phosphoric acid group or groups are bound through a heterocyclic ring, for example, through a pyrimidine ring or through a triazine ring, as, for example, in the case of the last five formulae above, can also be prepared in accordance with the invention by using as starting materials dyestuffs that already contain a heterocyclic ring that contains at least one labile halogen atom and replacing the labile halogen atoms, either wholly or in part, with the appropriate radical by reacting the dyestuffs with an amine that contains the phosphoric acid grouping. For example, a 2:4-dichloro-6-anthraquinonylaminotriazine dyestuff or a 2 - chloro - 4:6-bisanthraquinonylamino dyestuff can be reacted with an amine of the formula

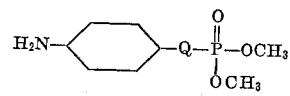

in which Q represents a direct bond or a CH₂ group or a —CH₂CH₂O— bridge.

If there is already a phosphoric acid group of the kind defined present in the amino-anthraquinones to be acylated, as in the case of the 1-amino-4-, -5- and -8-phosphato-benzoylaminoanthraquinones for example, the ordinary kinds of acylating agent can be used for acylating the free amino group.

As examples of acylating agents there may be mentioned those with or without further groups imparting solubility in water, for example, halides, of aliphatic or advantageously aromatic polybasic acids, for example, those of oxalic acid, sulphobenzoic acid, sulfo-acetic acid, succinic acid, glutaric acid, phthalic acid, isophthalic acid, terephthalic acid, azobenzene dicarboxylic acid, azodiphenyl dicarboxylic acid, perylene tetracarboxylic acid dianilide-dicarboxylic acid, anthanthrone dicarboxylic acid, furan- and thiophene dicarboxylic acid and more especially the halides of barbituric acid and cyanuric acid or the condensation products thereof, by the use of which the valuable products of the invention can be formed directly, that contain two or more anthraquinone radicals of the last-mentioned acylating agents there may be mentioned, for example, cyameluric acid chloride and the monocondensation products thereof, cyanuric chloride and its analogous monocondensation products with alcohols, phenols, mercaptans, ammonia and amines, especially sulfoaryl amines with or without dyestuff character, 2:4:6-trichloropyrimidine,
2:4:6-tribromopyrimidine,
2:4:5:6-tetrachloropyrimidine,
2:4-dichloro-6-methylpyrimidine,
2:4-dichloro-5-nitropyrimidine,
2:4-dichloro-5-nitro-6-methylpyrimidine,
2:4:6-trichloro-5-nitropyrimidine,
2:6-dichloropyrimidine-4-carboxylic acid chloride,
2:6-dichloropyrimidine-5-sulfonic acid chloride,
2:4-dichloropyrimidine-5-sulfonic acid,
2-(3'- or 4'-carboxyphenylamino)-4:6-dichloropyrimidine,
2-(3'- or 4'-carboxyphenylamino)-4:6:5-trichloropyrimidine or the compounds of the formulae

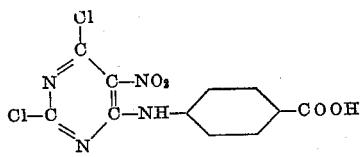

and

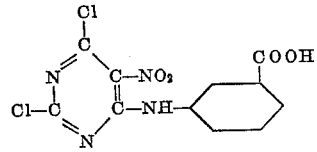

The acylation with the above mentioned acylating agents that contain the dichlorotriazine ring can be carried out in such a manner that first cyanuric chloride is reacted in a molar ratio of 1:1 with an anthraquinone derivative that contains an acylatable amino group and a phosphato group, and the resulting dichlorotriazine condensation product is reacted with an identical or different amino-anthraquinone until at least some of the exchangeable halogen atoms are replaced by stable radicals.

The acylation process of the invention can be carried out in an inert organic solvent, for example, in nitrobenzene, chlorobenzene or ortho-dichlorobenzene, at a raised temperature. However, in many cases it is also possible to perform the reaction in an aqueous medium, advantageously in the presence of an agent capable of binding acid, for example sodium acetate, sodium hydroxide or sodium carbonate.

Another method of carrying out the present manufacturing process consists in converting the characteristic phosphoric acid grouping into vat dyestuffs, for example, by carbazolation or the formation of oxdiazole or acridone after the said grouping has been introduced.

The dyestuffs obtained by the process of the present invention are new. They are suitable for dyeing a very wide variety of materials, and especially for dyeing or printing textile materials of natural or regenerated cellulose by the usual vat dyeing or printing methods. The dyeings and prints so obtained are generally fast to chlorine and are distinguished by their excellent fastness to light and excellent properties of wet fastness. In particular, their fastness to soda boiling is good.

The dyeings produced with the dyestuffs of the invention are also fast to dry cleaning and migration. The dyed fabrics can therefore be coated with synthetic resins, for example, polyvinyl chloride, without the dyestuff migrating into the resin, which is particularly important in the manufacture of artificial leather.

As compared with the conventional vat dyestuffs, the vat dyestuffs of the invention, which contain at least one OH group or SH group bound to the phosphorus atom or a radical easily convertible into such a group, possess a better levelling and penetrating power. When used for dyeing in circulating liquor machines the water-soluble vat dyestuffs in particular do not give rise to faulty dyeings caused by the precipitation of reoxidized dyestuff when foam is formed, and the pigmenting operation that is necessary in dyeing wound packages, for example, cheeses, or in dyeing tricots on a winch machine, with the conventional vat dyestuffs is superfluous with the dyestuffs of the invention. Moreover, they can be used in the form of solutions in fast-running pad-dyeing processes and do not have to be in the form of finely dispersed commercial preparations or in the form of special pastes, so that the disadvantages associated with such forms (instability of the paste, dusting and the need for one or more operations to prepare finely dispersed powders) do not arise. Finally, they can generally be vatted very easily, often at room temperature and, if desired, with mild reducing agents, which yield unsatisfactory results when used for conventional vat dyestuffs.

The process of vatting in a stock vat, which is a safety measure still in general use, can be omitted, and the dyestuff can be vatted in the dyebath at the commencement of the dyeing operation.

By virtue of the fact that the dyestuffs are easily dissolved and are converted into the leuco form with great rapidity, they can be used with advantage in high-speed dyeing and printing processes which do not allow of a long vatting time. When a suitable reducing agent is used which is virtually inactive at room temperature but which has a reducing action at a raised temperature, for example, in a steaming operation, the dyestuffs of the invention can also be applied, for example by a one-bath impregnating/steaming process.

Compared with the vat dyestuffs known hitherto, which contain non-eliminable sulfuric acid groups, the dyestuffs of the invention have the advantage that there is virtually no danger of fiber damage being caused by free phosphoric acid groupings adhering to the dyestuff, even if acidification after dyeing has not been carried out properly.

The dyestuff of the invention exhibits a very good solubility in the vat and, in most cases, require a substantially smaller amount of reducing agent than is generally needed when dyeing with conventional vat dyestuffs, especially when dyeing in circulating liquor machines.

The following examples illustrate the invention. Unless otherwise stated, the parts and percentages are by weight, and the relationship of parts by weight to parts by volume is the same as that of the gram to the milliliter.

EXAMPLE 1

2 parts of the vat dyestuff intermediate product of the formula

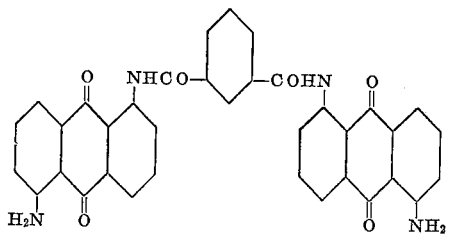

are dissolved at the boil in 100 parts of dry nitrobenzene, and the solution so obtained is cooled to 140° C. while stirring. At this temperature, 2.2 parts of para-chloroformylphenyl dichlorophosphate in 20 parts of nitrobenzene are added and the whole is stirred for 5 hours at 140 to 145° C. The dyestuff that precipitates thereby is isolated by filtration at 90° C., washed with a small amount of nitrobenzene and with warm dry benzene and then dried in vacuo at 60° C. The product so obtained has a phosphorus content of 5.69% and dyes cotton and regenerated cellulose strong yellow tints possessing good properties of fastness when applied from an alkaline hydrosulfite vat.

Dyeing prescription 1 part of the dyestuff so obtained is vatted at 45° C. in 100 parts of water with 2 parts of sodium hydrosulfite and in the presence of 4 parts by volume of sodium hydroxide solution of 30% strength. The stock vat so obtained is added to a solution of 4 parts by volume of sodium hydroxide solution of 30% strength and 2 parts of sodium hydrosulfite in 2000 parts of water. 100 parts of cotton are dyed for 1 hour at 40 to 50° C. in the dyebath so obtained in the presence of 10 parts of sodium chloride. The cotton is then squeezed, oxidized in the air, rinsed, acidified, rinsed again and then soaped at the boil.

EXAMPLE 2

2 parts of the dyestuff obtained in the manner described in Example 1 are vatted at 40 to 45° C. and reoxidized with air. The dyestuff is then precipitated from the resulting yellow-brown solution by the addition of 100 grams of sodium chloride per liter. The sodium salt of the product changed by hydrolysis is filtered off, washed with a sodium chloride solution of 5% strength until the washings run neutral, and then dried.

The new water-soluble dyestuff corresponds, in the form of the free acid, to the formula

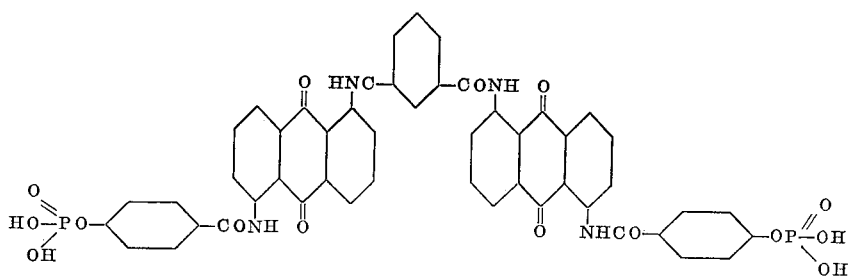

and dyes cotton and regenerated cellulose from an alkaline hydrosulfite vat, yellow tints similar to those obtained by the product described in Example 1 that exhibit the same properties of fastness.

When applied by the process described in Example 18 of Swiss Patent No. 365,698 patented Nov. 30, 1962, to Ciba Aktiengesellschaft, Basel, Switzerland, the above dyestuff yields a yellow print possessing good properties of fastness.

Dyeing prescription 2 parts of dyestuff are dissolved or suspended in 500 parts of water at 60° C. The dissolved or suspended dyestuff is vatted in a dyebath that contains 20 parts of sodium hydroxide solution of 30% strength and 12 parts of sodium hydrosulfite in 3500 parts of water. 100 parts of well-wetted cotton are entered into the dyebath so prepared at 60° C. and dyed therein for 10 minutes at that temperature in the presence of 60 parts of sodium chloride. The temperature is then raised to 70° C. and a further 60 parts of sodium chloride are added. After 15 minutes, the dyeing temperature is raised to 80° C., and dyeing is continued at that temperature for 15 minutes. The cotton is then removed from the dyebath, oxidized, neutralized, thoroughly soaped at the boil, rinsed, first in warm water and then in cold water, and then dried.

EXAMPLE 3

2 parts of the intermediate product mentioned in Example 1 are condensed with 2.2 parts of meta-chloroformylphenyl dichlorophosphate in the manner described in Example 1, and the resulting product is vatted in a manner analogous to that described in Example 2.

The water-soluble dyestuff so obtained, which, compared with the product described in Example 2, is meta-isomeric in respect of the position of the phosphato group, dyes cotton and regenerated cellulose yellow tints possessing good properties of fastness when applied from an alkaline hydrosulfite vat according to the dyeing prescription given in Example 2.

EXAMPLE 4

2.5 parts of the finely-ground dyestuff intermediate product of the formula

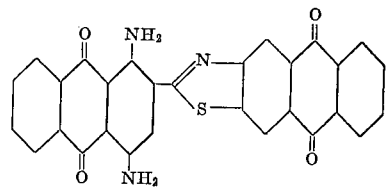

are stirred for 12 hours at 140° C. in 100 parts of dry nitrobenzene with 1.65 parts of para-chloroformylphenyldichlorophosphate. The condensation product is isolated in the manner described in Example 1 and revatted in the manner described in Example 2.

The dyestuff thus formed, which is readily soluble in water, corresponds, in the form of the free acid, to the formula

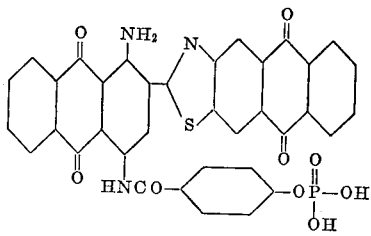

and dyes cotton and regenerated cellulose strong, fast blue tints when applied from an alkaline hydrosulfite vat according to the dyeing prescription given in Example 2.

EXAMPLE 5

2.3 parts of finely ground 5:5′-diamino-1:1′-dianthrimide carbazole are stirred for 24 hours at 120 to 130° C. in 100 parts of dry nitrobenzene with 3.3 parts of meta-chloroformylphenyl-dichlorophosphate, and working up is carried out in the manner described in Example 4. The water-soluble dyestuff that is formed thereby corresponds, in the form of the free acid, to the formula

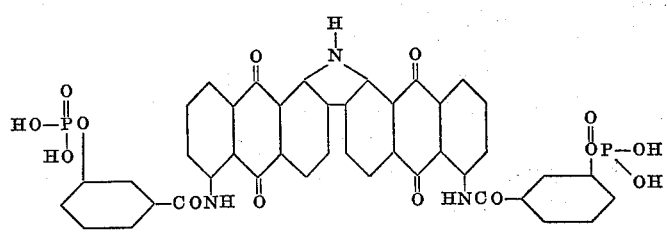

and dyes cotton and regenerated cellulose strong, fast brown-yellow tints when applied from an alkaline hydrosulfite vat according to the dyeing prescription given in Example 2.

When using para-chloroformylphenyl-dichlorophosphate as acylating component there is obtained in the above manner a dyestuff that is isomeric in respect of the position of the phosphato group and that yields similar tints having the same degree of fastness.

EXAMPLE 6

2.3 parts of the finely-ground dyestuff intermediate product of the formula

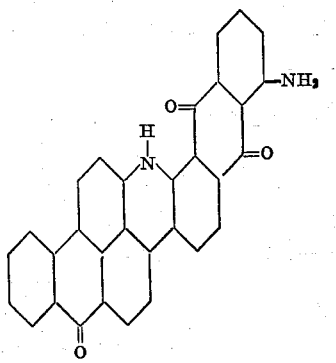

are stirred for 24 hours at 120 to 130° C. in 100 parts of dry nitrobenzene with 1.65 parts of meta-chloroformylphenyl-dichlorophosphate, and further processing is carried out in the manner described in Example 4. The dyestuff thus formed, which is readily soluble in water, corresponds, in the form of the free acid, to the formula

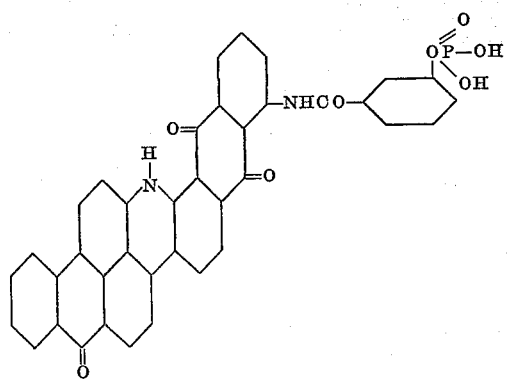

and dyes cotton and regenerated cellulose strong, olive-green tints possessing excellent properties of fastness when applied from an alkaline hydrosulfite vat according to the dyeing prescription given in Example 2.

A similar dyestuff is obtained in the above manner when using para-chloroformylphenyl-dichlorophosphate as acylating agent.

When applied by the pad-jig process described in Example 6 of Swiss Patent No. 365,698, patented Nov. 30, 1962, to Ciba Aktiengesellschaft, Basel, Switzerland, the above dyestuffs yield olive dyeings possessing excellent properties of fastness.

EXAMPLE 7

3.75 parts of 2-amino-7-chloro-3:4-phthaloylacridone are stirred for 24 hours at 130 to 140° C. in 50 parts of dry nitrobenzene with 3.3 parts of para-chloroformylphenyl-dichlorophosphate, and working up is carried out in the manner described in Example 4. There is obtained a water-soluble blue vat dyestuff whose free acid corresponds to the formula

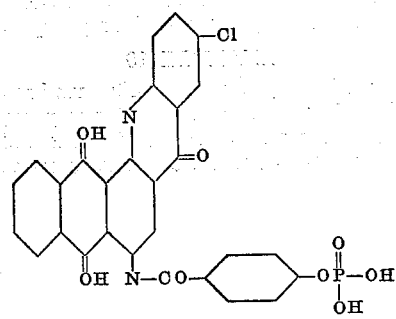

EXAMPLE 8

3.3 parts of the thioindigoid dyestuff intermediate product of the formula

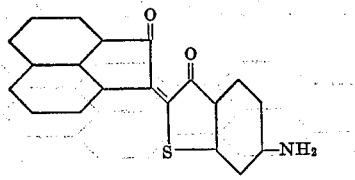

are stirred for 24 hours at 120 to 130° C. in 50 parts of dry nitrobenzene with 3.3 parts of para-chloroformylphenyl-dichlorophosphate. After working up in the manner described in Example 4 there is obtained a salmon-pink water-soluble vat dyestuff whose free acid corresponds to the formula

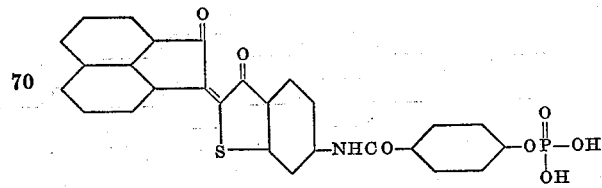

EXAMPLE 9

2.1 parts of finely-ground aminoacedianthrone are stirred for 24 hours at 120 to 130° C. in 100 parts of dry nitrobenzene with 1.65 parts of meta-chloroformylphenyl-dichlorophosphate, and working up is carried out in the manner described in Example 4. The water-soluble dyestuff that is formed thereby corresponds, in the form of the free acid, to the formula

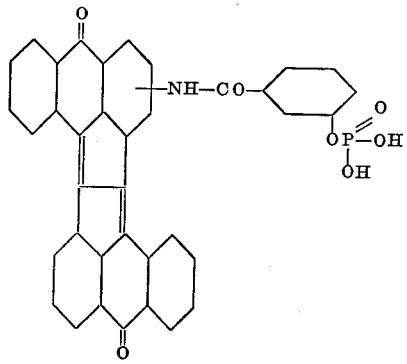

and dyes cotton and regenerated cellulose brown tints possessing an excellent fastness to light when applied according to the dyeing prescription given in Example 2.

A similar dyestuff is obtained in the above manner when using para-chloroformylphenyl-dichlorophosphate.

EXAMPLE 10

2.4 parts of finely-ground aminodibenzanthrone are reacted with 1.65 parts of meta-chloroformylphenyl-dichlorophosphate in the manner described in Example 9, and working up is carried out in the manner described in Example 9. The water-soluble dyestuff that is formed thereby corresponds, in the form of the free acid, to the formula

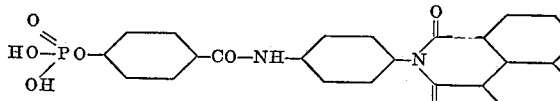

and dyes cotton and regenerated cellulose blue-green tints possessing a high fastness to light when applied according to the dyeing prescription given in Example 2.

A similar product is obtained when using para-chloroformylphenyl-dichlorophosphate as acylating agent.

EXAMPLE 11

2.9 parts of the finely-ground vat dyestuff intermediate product of the formula

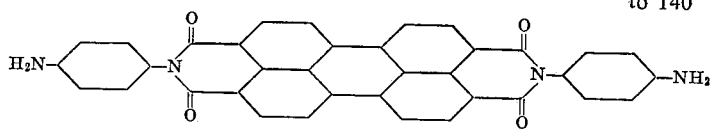

are suspended in 200 parts of dry nitrobenzene. 4.1 parts of parachloroformylphenyl-dichlorophosphate and 0.2 part of dimethylformamide are added and the whole is heated to 160 to 165° C. in the course of 6 hours, while stirring. After 16 hours, the temperature is raised to 180 to 185° C. The reaction mixture is maintained at that temperature for 5 hours, after which stirring is continued for 1 hour at 200 to 205° C., whereupon working up is carried out in the manner described in Example 4. The water-soluble dyestuff thus obtained corresponds, in the form of the free acid, to the formula

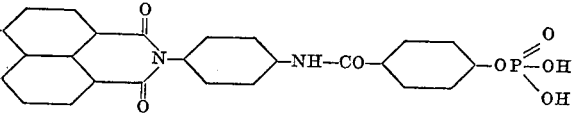

and dyes cotton and regenerated cellulose strong red tints possessing very good properties of fastness when applied according to the dyeing prescription given in Example 2.

A similar dyestuff is obtained in the above manner when using meta-chloroformylphenyl-dichlorophosphate.

EXAMPLE 12

2.7 parts of the finely-ground vat dyestuff intermediate product of the formula

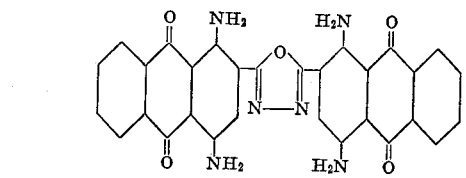

are heated to 140 to 145° C. in the course of 4 hours, while stirring, in 150 parts of dry nitrobenzene in the presence of 4.1 parts of parachloroformylphenyl-dichlorophosphate and 0.2 part of dimethylformamide, and the reaction mixture is maintained at that temperature for 20 hours. Stirring is then continued for a further hour at 160 to 165° C., and working up is then carried out in the manner described in Example 4.

The dyestuff thus formed, which is readily soluble in water, corresponds, in the form of the free acid, to the formula

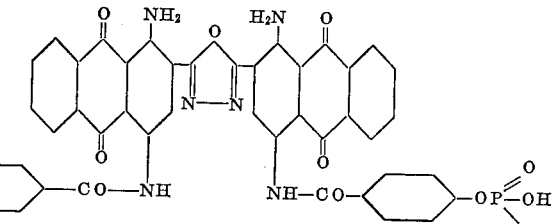

and dyes cotton and regenerated cellulose strong, blue tints when applied according to the dyeing prescription given in Example 2. A similar dyestuff is obtained in the above manner when using meta-chloroformylphenyl-dichlorophosphate.

EXAMPLE 13

2.2 parts of 1-aminoanthraquinone and 1.8 parts of 3:5-dichloroformylphenyl-dichlorophosphate are heated to 140° C. in the course of 20 minutes, while stirring, in 50 parts of dry nitrobenzene, and the mixture is stirred for a further 15 minutes at that temperature. The yellow, crystalline condensation product that is formed is isolated by suction filtration after cooling the reaction mixture, washed with benzene, and then dried in vacuo at 60° C. It has a phosphorus content of 4.9%.

2 parts of the above product are revatted in the manner described in Example 2. The dyestuff that is formed thereby, which is readily soluble in the vat, corresponds, in the form of the free acid, to the formula

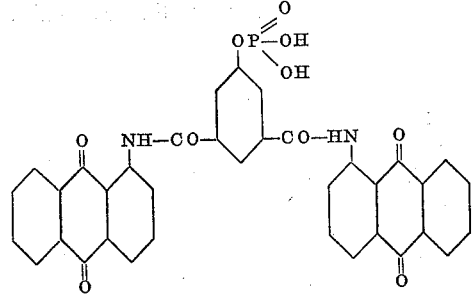

and dyes cotton and regenerated cellulose yellow tints possessing good properties of fastness when applied according to the dyeing prescription given in Example 2.

EXAMPLES 14 TO 20

Further valuable dyestuffs of the kind defined are obtained from 3:5 - dichloroformylphenyl-dichlorophosphate in the above manner when using substituted amino-anthraquinone derivatives such as

| Example No. | Amino-anthraquinone | Tint |
|---|---|---|
| 14 | 1-amino-4-benzoylamino-anthraquinone | Red. |
| 15 | 1-amino-5-benzoylamino-anthraquinone | Yellow. |
| 16 | 1-amino-4-phenylmercapto-anthraquinone | Red. |
| 17 | 1-amino-5-phenylmercapto-anthraquinone | Golden-yellow. |
| 18 | 1-amino-4-anilido-anthraquinone | Reddish-blue. |
| 19 | 1-amino-4-methoxy-anthraquinone | Golden-orange. |
| 20 | 1-amino-5-chloranthraquinone | Yellow. |

The 3:5-dichloroformylphenyl-dichlorophosphate used in the above examples can be prepared from 5-hydroxyisophthalic acid by reaction with phosporous pentachloride in phosphorus oxychloride in a manner analogous to the preparation of para- or meta-chloroformylphenyl-dichlorophosphate (R. Anschuetz and G. D. Moore, Annalen, vol. 239, page 333 (1867)) and can be obtained in a pure form as a colorless oil boiling at 210 to 212° C. at a pressure of 17 mm. of Hg by fractional distillation.

EXAMPLE 21

2 parts of the non-revatted dyestuff of Example 17 are introduced at 15 to 18° C. into 20 parts by a volume of sulfuric acid of 98% strength and stirred therein for 45 minutes at room temperature. The mixture is then discharged on the 200 parts of ice, filtered, and the filter residue is washed with a sodium chloride solution of 1% strength until the washings run neutral and then dried in vacuo at 60° C.

The sulfonated product so obtained has a sulfur content of 8.9% in addition to a phosphorus content of 3.1% and, after being revatted in the manner described in Example 2, yields a dyestuff that is readily soluble in water and that dyes cotton and regenerated cellulose fast golden-yellow tints when applied according to the dyeing prescription given in Example 2.

The dyestuff in Example 16 can also be converted in an analogous manner into a product that contains sulfo groups.

EXAMPLE 22

4.5 parts of 4-β-acetoxy-ethoxybenzoic acid (prepared by acetylating 4-β-hydroxyethoxybenzoic acid with acetic anhydride), 2.6 parts of thionylchloride and 0.2 part of dimethylformamide are converted into an acid chloride solution by stirring for 18 hours at 85° C. in 50 parts of dry nitrobenzene. 4.2 parts of finely-ground aminoacedianthrone in 100 milliliters of dry nitrobenzene are added, and the temperature is raised to 140 to 145° C. in the course of 3 hours. After 22 hours, the temperature is raised to 160 to 165° C. and stirring is continued for a further 6 hours. The reaction mixture is then allowed to cool. It is then filtered and the filter residue is washed with a small amount of nitrobenzene and alcohol and then dried in vacuo at 60° C.

5.9 parts of the dried and finely-sieved product are introduced at 5 to 10° C. into 80 parts by volume of sulfuric acid of 85% strength and the whole is stirred for 3 hours. The brown, viscous paste that is formed is discharge onto the 800 parts of ice and water, filtered off, washed with water, finely dispersed by suspending it in 1000 parts of water while stirring rapidly, suction filtered, washed until the washings run neutral and then dried in vacuo at 60° C. The dyestuff intermediate product of the formula

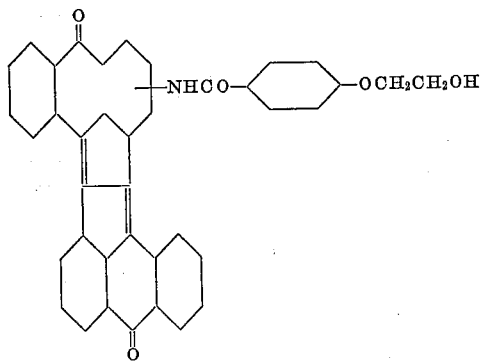

is thus obtained.

2.5 parts of the said dyestuff intermediate product are finely sieved, introduced into 60 parts of polyphosphoric acid at 100° C. and the whole is stirred at that temperature for 2 hours. The resulting dark brown paste is discharged into 600 parts of water, stirred for 1 hour, filtered off, washed with warm water until neutral and then dried in vacuo at 100° C. After being revatted in a manner analogous to that described in Example 2, the product so obtained has a phosphorus content of 4.0%.

The dyestuff so obtained, which is readily soluble in the vat, corresponds, in the form of the free acid, to the formula

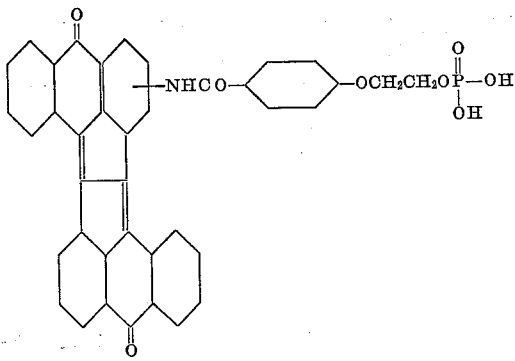

and dyes cotton and regenerated cellulose fast brown tints when applied according to the dyeing prescription given in Example 2.

EXAMPLE 23

4.6 parts of the finely-ground intermediate product described in Example 6 and an acid chloride solution prepared from 3.4 parts of 4-β-acetoxyethoxybenzoic acid, 1.9 parts of thionyl chloride and 0.2 part of dimethylformamide in 50 parts of dry nitrobenzene in the manner described in Example 22 are stirred for 24 hours at 120 to 130° C. and subsequently for 6 hours at 140 to 145° C. in 100 parts of dry nitrobenzene, and the resulting product is worked up in the appropriate manner.

4.5 parts of the condensation product so obtained are hydrolyzed to the corresponding hydroxyethoxy intermediate product in 80 parts by volume of sulfuric acid of 85% strength, and then working up is carried out in the manner described in Example 22.

The dyestuff obtained by phosphating 2.5 parts of the intermediate product so obtained in 60 parts of polyphosphoric acid and further treatment in the manner de- 2.5 parts of the hydroxy-ethoxy intermediate product so obtained are stirred for 6 hours in 60 parts of polyphosphoric acid at 55 to 65° C., and working up is then carried out in the manner described in Example 22. A product with a phosphorus content of 5.8% is obtained.

The dyestuff so obtained, which is readily soluble in the vat, corresponds, in the form of the free acid, to the formula

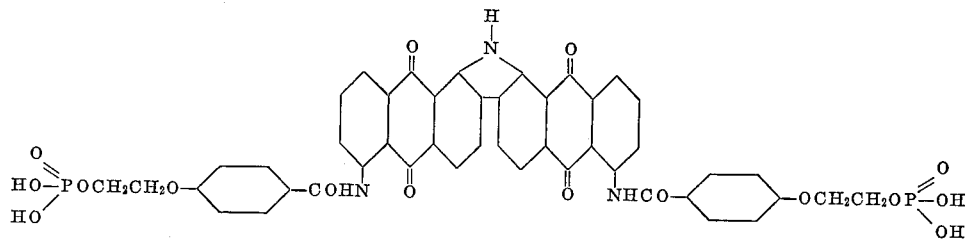

scribed in Example 22 is readily soluble in the vat, corresponds, in the form of the free acid, to the formula

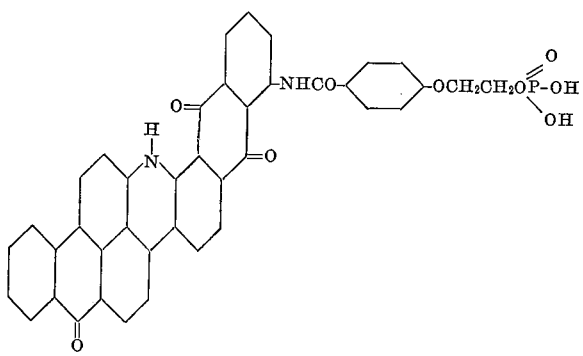

and dyes cotton and regenerated cellulose olive-green tints possessing excellent properties of fastness when applied according to the dyeing prescription given in Example 2.

EXAMPLE 24

6.7 parts of 4-β-acetoxyethoxybenzoic acid, 3.9 parts of thionyl chloride and 0.2 part of dimethylformamide are converted into an acid chloride solution in 50 parts of dry nitrobenzene in the manner described in Example 22, the acid chloride solution so obtained is stirred for 20 hours at 140 to 145° C. with 4.6 parts of finely-ground 5:5'-diamino-1:1'-dianthrimide carbazole in 100 parts of dry nitrobenzene, and working up is carried out in a manner analogous to that described in Example 22.

7.5 parts of the condensation product so obtained are hydrolyzed in 100 parts by volume of sulfuric acid of 85% strength to form the corresponding hydroxy-ethoxy intermediate product in the manner described in Example 22.

and dyes cotton and regenerated cellulose strong orange tints possessing very good properties of fastness when applied according to the dyeing prescription given in Example 2.

EXAMPLE 25

2.7 parts of the finely ground dyestuff intermediate product described in Example 12 are added at 85° C. to an acid chloride solution prepared from 4.5 parts of 4-β-acetoxy-ethoxybenzoic acid in a manner described in Example 22. The temperature is then raised to 140 to 145° C. in the course of 3 hours and stirring is continued at that temperature for 4 to 5 hours. After the addition of 500 parts of benzene, the reaction mixture is cooled while stirring, filtered, the filter residue is washed with benzene and then dried in vacuo at 60° C.

4 parts of the condensation product so obtained are hydrolyzed in 60 parts by volume of sulfuric acid of 85% strength in the manner described in Example 22 to form the corresponding hydroxyethoxy intermediate product.

The dyestuff obtained by phosphating 2 parts of the intermediate product so obtained at 55 to 60° C. in 50 parts of polyphosphoric acid and further treatment in the manner described in Example 22 is readily soluble in the vat and corresponds, in the form of the free acid, to the formula

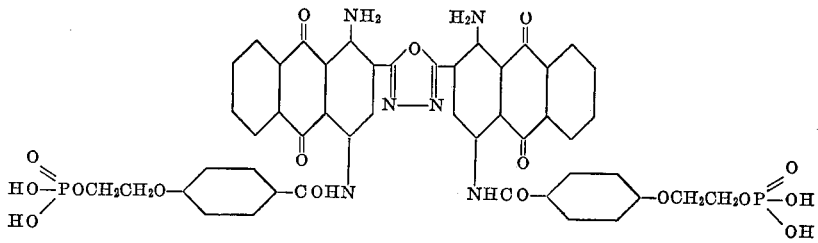

It dyes cotton and regenerated cellulose blue tints possessing excellent properties of fastness when applied according to the dyeing prescription given in Example 2.

EXAMPLE 26

3.9 parts of para-carboxybenzylacetate (cf. J. Amer. Chem. Soc., vol. 72, 5152 [1950]) are converted into an acid chloride solution with 1.6 parts of thionyl chloride and 0.2 part of dimethylformamide by stirring for 15 hours at 85° C. and 50 parts of dry nitrobenzene. After the addition of 4.2 parts of finely-ground amino-acedianthrone in 100 parts of dry nitrobenzene, processing is continued in the manner described in Example 22.

There is first obtained the methylol intermediate product of the formula

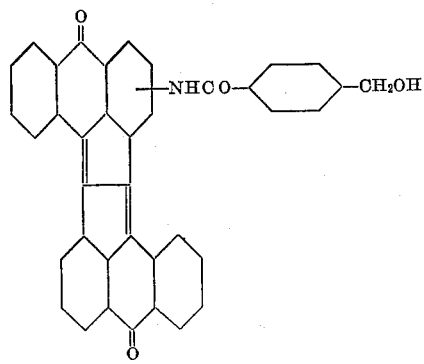

which corresponds to the hydroxyethoxy derivative described in Example 22. The dyestuff obtained by phosphating the said intermediate product with polyphosphoric acid and further treatment in the manner described in Example 22 is readily soluble in the vat and, in the form of the free acid, corresponds to the formula

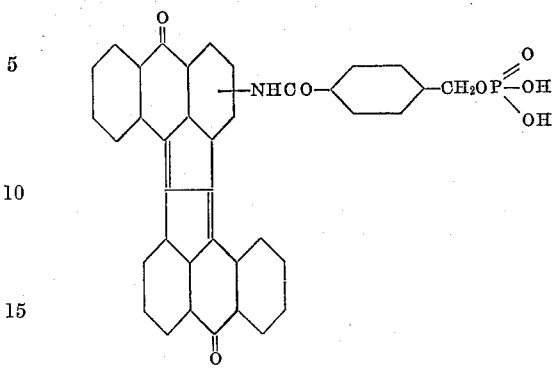

It dyes cotton and regenerated cellulose strong brown tints possessing good properties of fastness when applied according to the dyeing prescription given in Example 2.

EXAMPLES 27 TO 29

When working according to the methods described in Examples 23, 24 and 25 but using equivalent amounts of para-carboxybenzylacetate instead of 4-β-ocetoxyethoxy-benzoic acid, the following dyestuffs of the same kind are obtained:

| Example No. | | Tint |
|---|---|---|
| 27 | (Analogous to Example 23) | Olive-green. |
| 28 | (Analogous to Example 24) | Orange. |
| 29 | (Analogous to Example 25) | Blue. |

EXAMPLE 30

1.6 parts of O:O'-di-para-carboxyphenylphosphoric acid are converted into an acid chloride solution with 1.8 parts of thionylchloride and 0.1 part of dimethylformamide by stirring for 16 hours at 85° C. in 50 parts of dry ortho-dichlorobenzene. 3.1 parts of 1-amino-5-benzoylaminoanthraquinone are then added and processing is continued in the manner described in Example 45.

The condensation product so obtained has a phosphorus content of 3.2%. The dyestuff obtained therefrom by revatting is readily soluble in the vat and, in the form of the free acid, corresponds to the formula

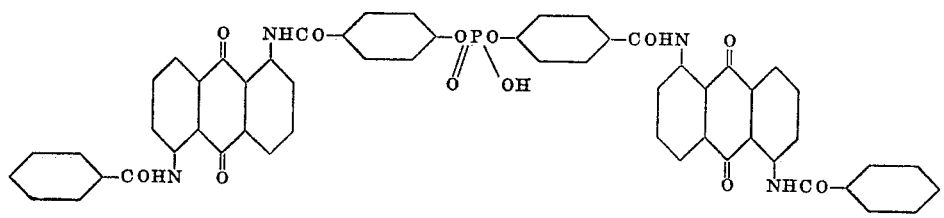

It dyes cotton and regenerated cellulose fast yellow tints when applied according to the dyeing prescription given in Example 2.

EXAMPLES 31 TO 34

Further valuable dyestuffs of the kind defined are obtainable in the above manner by using other substituted aminoanthraquinones such as

| Example No. | Amino-anthraquinone | Tint |
|---|---|---|
| 31 | 1-amino-4-benzoylaminoanthraquinone | Red. |
| 32 | 1-amino-4-phenylmercaptoanthraquinone | Red. |
| 33 | 1-amino-5-phenylmercaptoanthraquinone | Golden yellow. |
| 34 | 1-amino-4-anilidoanthraquinone | Blue. |

The O:O'-di-para-carboxyphenylphosphoric acid used in the examples can be prepared in the manner described in British patent specification No. 912,287 of Imperial Chemical Industries, Ltd., published Dec. 5, 1962, by hydrolyzing its trimethyl ester with 5 N hydrochloric acid.

EXAMPLE 35

2.4 parts of the acid potassium salt of paracarboxyphenyl phosphonic acid (cf. A. Michaelis and Cl. Panek, Berichte, page 14, 405 [1881]), 4.3 parts of thionyl chloride and 0.2 part of dimethylformamide are stirred for 12 hours at 85° C. in 20 parts of dry nitrobenzene. The resulting solution of the acid chloride is added at 140 to 145° C. to 3 parts of the dyestuff intermediate product described in Example 1 that has been finely divided in 100 parts of dry nitrobenzene by dissolving and cooling. The mixture is then stirred for 8 hours at 140 to 145° C.

After working up in the appropriate manner, the product so obtained has a phosphorus content of 5.2%.

The water-soluble dyestuff obtained therefrom by revatting in the manner described in Example 2 corresponds, in the form of the free acid, to the formula

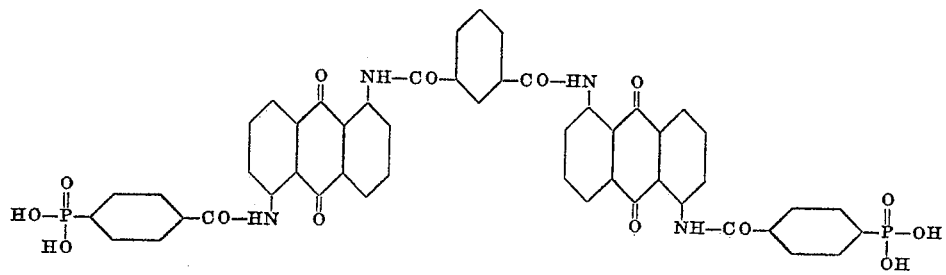

and dyes cotton and regenerated cellulose strong, fast yellow tints when applied according to the dyeing prescription given in Example 2.

A similar dyestuff is obtainable by the above process by the use of the isomeric mixture of carboxyphenylphosphonic acids.

EXAMPLE 36

2.3 grams of finely-ground 5:5'-diamino-1:1'-di-anthrimide carbazole in 100 parts of dry nitrobenzene are added to an acid chloride solution of para-carboxyphenylphosphonic acid prepared in the manner described in Example 35. The whole is stirred for 24 hours at 120 to 130° C. and then worked up in the manner described in Example 4. The water-soluble dyestuff so obtained corresponds, in the form of the free acid, to the formula

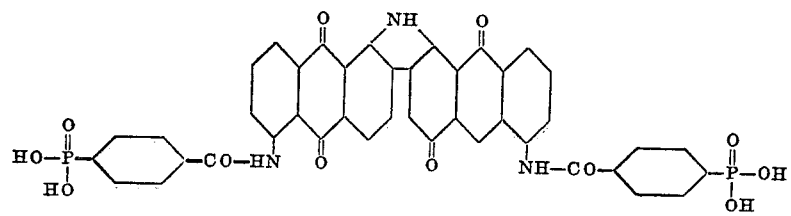

and dyes cotton and regenerated cellulose strong orange-brown tints possessing good properties of fastness when applied according to the dyeing prescription given in Example 2.

A similar dyestuff is obtained by using the isomeric mixture of the carboxyphenyl phosphonic acids.

EXAMPLE 37

4.6 parts of finely-ground 4:4′-diamino-1:1′-di-anthrimide in 150 parts of dry nitrobenzene are added to an acid chloride solution prepared from 48 parts of the acid potassium salt of para-carboxyphenyl phosphonic acid, 8.6 parts of thionyl chloride and 0.3 parts of dimethylformamide in 50 parts of dry nitrobenzene in the manner described in Example 35. The whole is then heated to 120 to 130° C. in the course of 5 hours, while stirring, maintained at that temperature for 20 hours and then working up is carried out in the manner described in Example 1.

4.5 parts of the product so obtained are introduced slowly, while stirring, at 30° C. into 100 parts by volume of sulfuric acid of 96% strength, and stirring is continued for 2 hours at 30° C. The black solution so obtained is poured, while stirring thoroughly, into 1000 parts of water (containing 0.25 part of sodium chlorate) in the form of a fine jet and the whole is heated to 80° C. in the course of 1 hour. After dilution with 300 parts of cold water, the liquid is filtered at 50° C., the filter residue is washed thoroughly with warm water and then dried in vacuo at 80° C.

The water-soluble dyestug obtained by revatting in the manner described in Example 2 corresponds, in the form of the free acid, to the formula

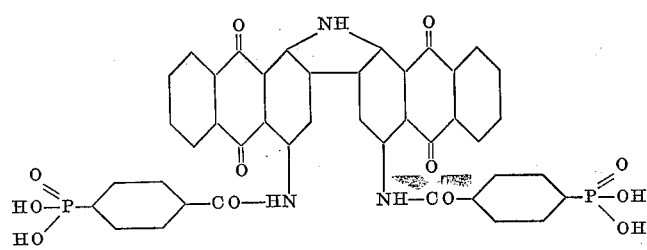

and dyes cotton and regenerated cellulose olive-grey tints when applied according to the dyeing prescription given in Example 2.

A similar dyestuff is obtained by using 4:4′-di-amino-1:1′-dianthrimide carbazole as starting material and working according to the process described in Example 36.

Similar dyestuffs are also obtained by using the isomeric mixture of the carboxy phenylphosphonic acid.

EXAMPLE 38

1.7 parts of the acid potassium salt of para-carboxyphenylphosphonic acid are converted into the acid chloride solution with 3 parts of thionyl chloride in 20 parts of dry nitrobenzene in the manner described in Example 35. 2.1 parts of finely ground amino-acedianthrone in 100 parts of dry nitrobenzene are added and the whole is stirred for 24 hours at 120 to 130° C.

The water-soluble dyestuff obtained by working up in the manner described in Example 4 corresponds, in the form of the free acid, to the formula

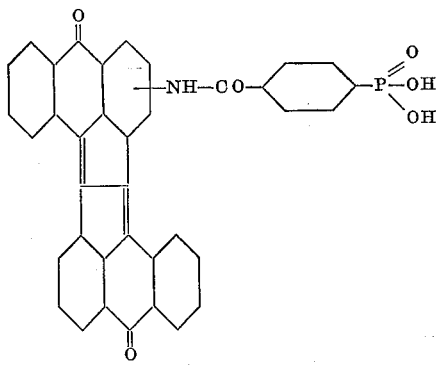

and dyes cotton and regenerated cellulose brown tints possessing an excellent fastness to light when applied according to the dyeing prescription given in Example 2.

A similar dyestuff is obtained by using the isomeric mixture of the carboxyphenyl phosphonic acids.

EXAMPLE 39

2.4 parts of finely-ground aminodibenzanthrone are reacted in a manner analogous to that described in the preceding example with the acid chloride solution prepared from 1.7 parts of the acid potassium salt of para-carboxyphenyl phosphonic acid in 180 parts of dry nitrobenzene. The water-soluble dyestuff obtained by working up in the same manner corresponds, in the form of the free acid, to the formula

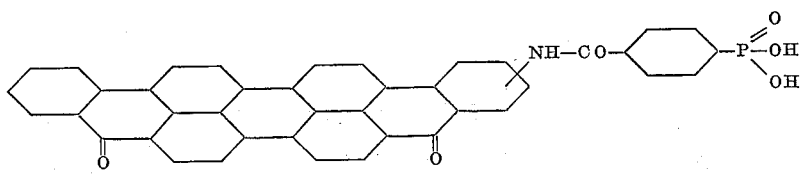

and dyes cotton and regenerated cellulose strong, bluish grey tints possessing a high degree of light fastness when applied according to the dyeing prescription given in Example 2.

This dyestuff yields fast, blue-grey tints on wool when applied from a vat by the usual special process.

A similar dyestuff is obtained by using the isomeric mixture of the carboxyphenyl phosphonic acids.

EXAMPLE 40

2.3 parts of the dyestuff intermediate product described in Example 6 are reacted according to the method described in Example 38 with the acid chloride solution prepared from 1.7 parts of the acid potassium salt of para-carboxyphenylphosphonic acid in the manner described in Example 38, and then working up is carried out in a manner analogous to that described in Example 38. The dyestuff so obtained is readily soluble in water and, in the form of the free acid, corresponds to the formula

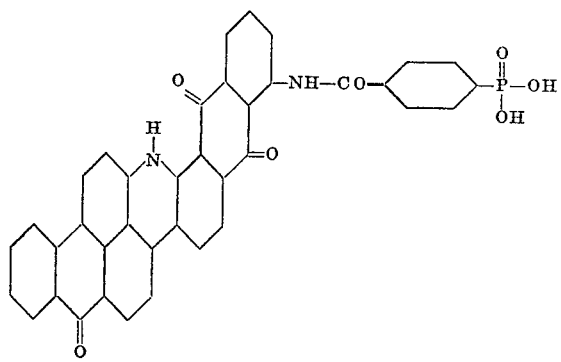

It dyes cotton and regenerated cellulose strong, olive-green tints possessing very good properties of fastness when applied according to the dyeing prescription given in Example 2.

The surprising observation has been made that the dyestuff so obtained has a much better solubility than the corresponding product obtained by known methods by acylation with benzoic acid sulfochloride and which contains a sulfo group instead of a phosphoric acid group.

EXAMPLE 41

2.7 parts of the finely-ground dyestuff intermediate product described in Example 12 in 100 parts of dry nitrobenzene are added to 3.3 parts of the acid chloride solution prepared from 3.3 parts of the acid potassium salt of para-carboxyphenyl phosphonic acid and 6 parts of thionyl chloride and 0.3 part of dimethylformamide in 50 parts of dry nitrobenzene in the manner described in Example 35. The whole is heated to 140 to 145° C. in the course of 2 hours, while stirring, and is maintained at that temperature for 22 hours. Stirring is then continued for a further 2 hours at 160 to 165° C., and working up is then carried out in the manner described in Example 4. The water-soluble dyestuff so obtained corresponds, in the form of the free acid, to the formula and dyes cotton and regenerated cellulose strong, blue tints possessing good properties of fastness when applied according to the dyeing prescription given in Example 2.

A similar dyestuff is obtained by using the isomeric mixture of the carboxyphenyl phosphonic acids.

EXAMPLE 42

2.4 parts of para-carboxybenzyl phosphonic acid are converted into an acid chloride solution with 4.3 parts of thionyl chloride and 0.2 part of dimethylformamide in 20 parts of dry nitrobenzene in the manner described in Example 35, and the acid chloride solution so obtained is reacted with 3 parts of the dyestuff intermediate product described in Example 1 in the manner described in Example 35. The condensation product so obtained has a phosphorus content of 5.72%. The water-soluble dyestuff obtained therefrom by revatting in the manner described in Example 4 corresponds, in the form of the free acid, to the formula

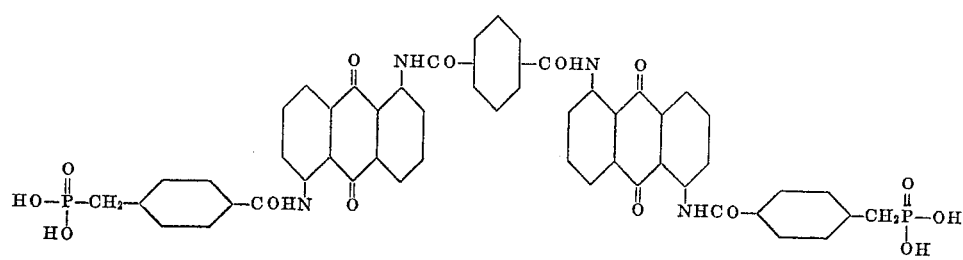

and dyes cotton and regenerated cellulose strong yelllow tints possessing good properties of fastness when applied according to the dyeing prescription given in Example 2.

The para-carboxybenzyl phosphonic acid having a melting point of 344 to 346° C. (with decomposition) can be prepared by hydrolyzing para-carbomethoxybenzyl phosphonic acid diethyl ester (described in German patent specification No. 1,129,947 of Badische Anilin- und Soda-Fabrik A. G., Ludwigshafen(Rhine), Germany, published May 24, 1962) with concentrated hydrochloric acid.

EXAMPLE 43

An acid chloride solution of para-carboxybenzyl phosphonic acid as described in Example 42 is reacted with 2.3 parts of finely-ground 5:5'-diamino-1:1'-dianthrimide carbazole in the manner described in Example 36. The water-soluble dyestuff obtained by working up the reaction product in a manner analogous to that described in Ex-

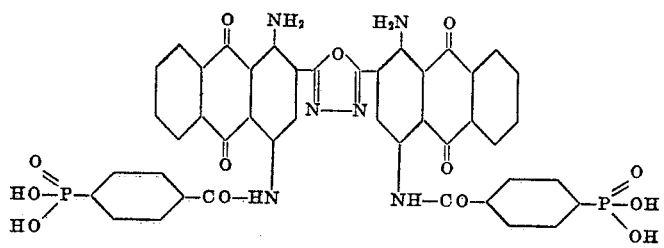

ample 4 corresponds, in the form of the free acid, to the formula

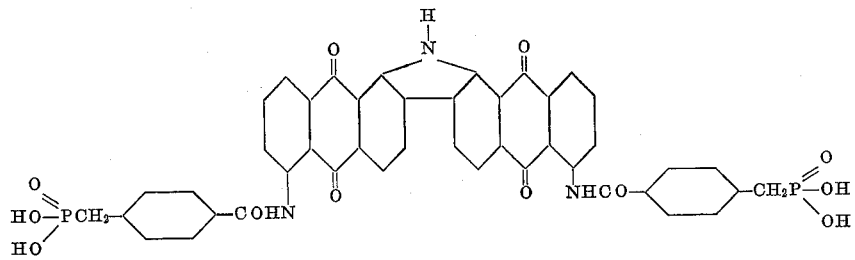

and dyes cotton and regenerated cellulose orange-brown tints possessing very good properties of fastness when applied according to the dyeing prescription given in Example 2.

EXAMPLE 44

1.6 parts of para-carboxybenzylphosphonic acid are converted into an acid chloride solution with 2.9 parts of thionyl chloride and 0.2 part of dimethylformamide in 30 parts of dry nitrobenzene in the manner described above, and the acid chloride solution so obtained is reacted with 2.1 parts of finely-ground aminoacedianthrone in the manner described in Example 38. The reaction product is then worked up.

The water-soluble dyestuff so obtained corresponds, in the form of the free acid, to the formula

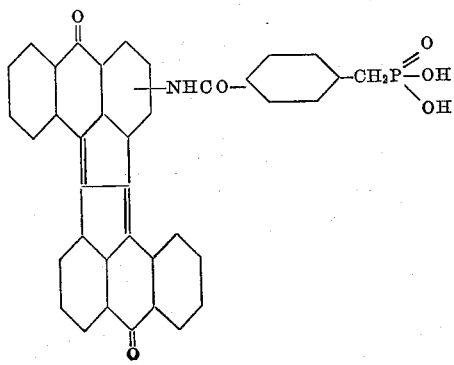

and dyes cotton and regenerated cellulose brown tints possessing good properties of fastness when applied according to the dyeing prescription given in Example 2.

EXAMPLE 45

1.5 parts of secondary 4:4'-dicarboxydiphenylphosphonic acid are converted into an acid chloride solution with 1.9 parts of thionyl chloride and 0.1 part of dimethylformamide by stirring for 16 hours at 85° C. in 50 parts of dry ortho-dichlorobenzene. 3.4 parts of 1-amino-5-benzoylamino-anthraquinone are then added, the temperature is raised to 140° C. and stirring is continued for a further 15 minutes. After cooling the reaction mixture, washing is carried out successively with a small amount of ortho-dichlorobenzene and benzene and the material is then dried in vacuo at 60° C. The resulting condensation product has a phosphorus content of 2.8%.

The dyestuff obtained therefrom by revatting according to the method described in Example 2 is readily soluble in the vat and, in the form of the free acid, corresponds to the formula

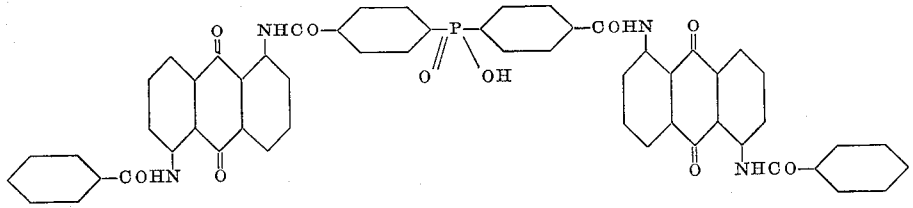

It dyes cotton and regenerated cellulose yellow tints possessing excellent properties of fastness and in particular a very good fastness to light when applied according to the dyeing prescription given in Example 2.

EXAMPLES 46 TO 49

Further valuable dyestuffs of the kind defined are obtained in the above manner by using other substitued amino-anthraquinones such as

| Example No. | Amino-anthraquinone | Tint |
| --- | --- | --- |
| 46 | 1-amino-4-benzoylamino-anthraquinone | Red. |
| 47 | 1-amino-4-phenylmercapto-anthraquinone. | Red. |
| 48 | 1-amino-5-phenylmercapto-anthraquinone. | Golden-yellow. |
| 49 | 1-amino-4-anilido-anthraquinone | Blue. |

EXAMPLE 50

2 parts of the sieved dyestuff described in Example 48 are sulfonated in 20 parts by volume of sulfuric acid of 98% strength in the manner described in Example 21 and then worked up in the appropriate manner.

The product so obtained, which contains sulfo groups, has a sulfur content of 8.2% and, after being revatted in the manner described in Example 2, yields a water-soluble dyestuff which dyes cotton and regenerated cellulose fast, golden-yellow tints when applied according to the dyeing prescription given in Example 2.

EXAMPLE 51

5.4 parts of the finely-ground dyestuff intermediate product described in Example 12 are suspended in 125 parts of dry nitrobenzene, and 4.8 parts of phosphonic acetic acid trichloride in 20 parts of dry nitrobenzene are added to the suspension so obtained at 70° C. The temperature is then raised to 100° C. in the course of 3 hours, while stirring, and the reaction mixture is maintained at that temperature. After 4 hours, 1 part of the acid chloride in 10 parts of dry nitrobenzene is added, stirring is continued for a further 2 hours at 100° C., and then working up is carried out in the manner described in Example 4.

The dyestuff so obtained is readily soluble in water and, in the form of the free acid, corresponds to the formula

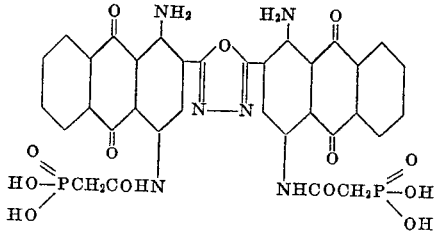

It dyes cotton and regenerated cellulose strong blue tints possessing good properties of fastness and in particular a very good fastness to chlorine when applied according to the dyeing prescription given in Example 2.

What is claimed is:

1. In a process for the vat dyeing of cellulosic textile material the improvement which comprises employing as the vat dyestufl a vat dyestuff containing two members of the group consisting of the anthrone, acridone and anthraquinone grouping which may be condensed to a ring system, and an acylamino group containing a phosphoric acid grouping bound to its acyl radical at least two vattable systems and at least one vat-stable phosphoric acid grouping.

2. In a process for the vat dyeing of cellulosic textile material the improvement which comprises employing as the vat dyestuff a vat dyestuff containing a vattable system consisting of at least five pured rings and containing at least one vat-stable phosphoric acid grouping.

3. In a process for the vat dyeing of cellulosic textile material the improvement which comprises employing as the vat dyestuff a vat dyestuff of the type containing two amino anthraquinone nuclei interconnected by the radical of a dicarboxylic acid wherein the vat dyestuff molecule contains at least one vat-stable phosphoric acid grouping.

4. In a process for the vat dyeing of cellulosic textile material the improvement which comprises employing as the vat dyestuff a vat dyestuff of the type containing two amino anthraquinone nuclei interconnected by the radical of a dicarboxylic acid the said dicarboxylic acid radical containing a vat-stable phosphoric acid grouping.

5. In a process for the vat dyeing of cellulosic textile material the improvement which comprises employing as the vat dyestuff a vat dyestuff of the type containing two amino anthraquinone nuclei interconnected by the radical of a dicarboxylic acid and furthermore containing at least one additional acylamino group in the dyestuff molecule wherein at least one such acylamino group carries a vat-stable phosphoric acid grouping.

6. In a process for the vat dyeing of cellulosic textile material the improvement which comprises employing as the vat dyestuff a vat dyestuff of the type consisting of two anthraquinone radicals interconnected by a heterocyclic ring and furthermore containing at least one acylamino group in the dyestuff molecule wherein at least one such acylamino group carries a vat-stable phosphoric acid grouping.

7. In a process for the vat dyeing of cellulosic textile material the improvement which comprises employing as the vat dyestuff a vat dyestuff of the dianthrimide cabazol type which carries at least one acylamino group containing a vat-stable phosphoric acid grouping.

8. In a process for the vat dyeing of cellulosic textile material the improvement which comprises employing as the vat dyestuff a vat dyestuff containing the vattable system

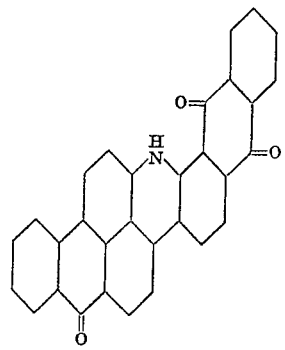

and attached thereto at least one acylamino group containing a vat-stable phosphoric acid grouping.

9. In a process for the vat dyeing of cellulosic textile material the improvement which comprises employing as the vat dyestuff a vat dyestuff according to claim 1 containing as vat-stable phosphoric acid grouping an acylamino group of the formula

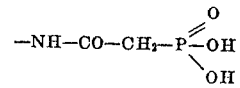

10. In a process for the vat dyeing of cellulosic textile material the improvement which comprises employing as the vat dyestuff a vat dyestuff according to claim 1 containing as vat-stable phosphoric acid grouping an acylamino group of the formula

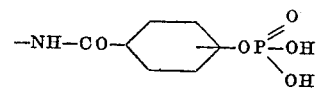

11. In a process for the vat dyeing of cellulosic textile material the improvement which comprises employing as the vat dyestuff a vat dyestuff according to claim 1 containing as vat-stable phosphoric acid grouping an acylamino group of the formula

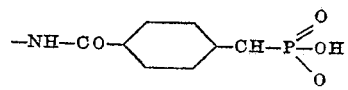

12. In a process for the vat dyeing of cellulosic textile material the improvement which comprises employing as the vat dyestuff a vat dyestuff according to claim 4 containing a dicarboxylic acid radical of the formula

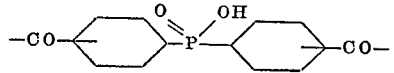

13. In a process for the vat dyeing of cellulosic textile material the improvement which comprises employing as the vat dyestuff a vat dyestuff according to claim 4 containing a dicarboxylic acid radical of the formula

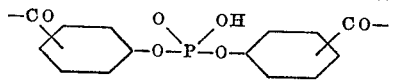

14. In a process for the vat dyeing of cellulosic textile material the improvement which comprises employing as the vat dyestuff a vat dyestuff according to claim 4 containing a dicarboxylic acid radical of the formula

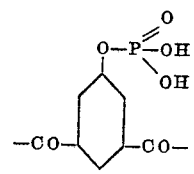

15. In a process for the vat dyeing of cellulosic textile material the improvement which comprises employing as the vat dyestuff a vat dyestuff according to claim 1 containing an acylamino group of the formula

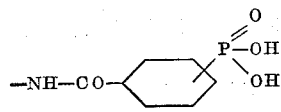

16. In a process for the vat dyeing of cellulosic textile material the improvement which comprises employing as the vat dyestuff a vat dyestuff according to claim 1 containing an acylamino group of the formula

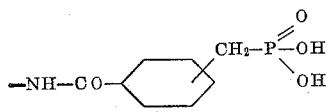

17. In a process for the vat dyeing of cellulosic textile material the improvement which comprises employing as the vat dyestuff a vat dyestuff according to claim 1 containing an acylamino group of the formula

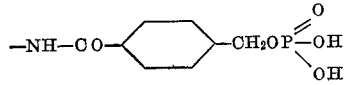

18. In a process for the vat dyeing of cellulosic textile material the improvement which comprises employing as the vat dyestuff a vat dyestuff according to claim 1 containing an acylamino group of the formula

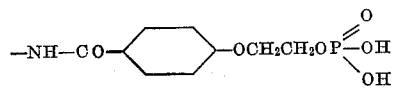

19. In a process for the vat dyeing of cellulosic textile material the improvement which comprises employing as the vat dyestuff the vat dyestuff of the formula

20. In a process for the vat dyeing of cellulosic textile material the improvement which comprises employing as the vat dyestuff the vat dyestuff of the formula

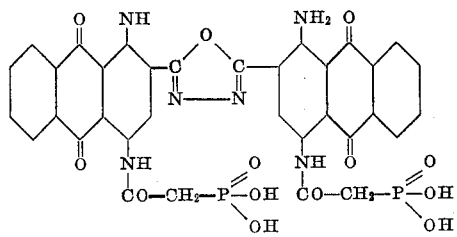

21. In a process for the vat dyeing of cellulosic textile material the improvement which comprises employing as the vat dyestuff the vat dyestuff of the formula

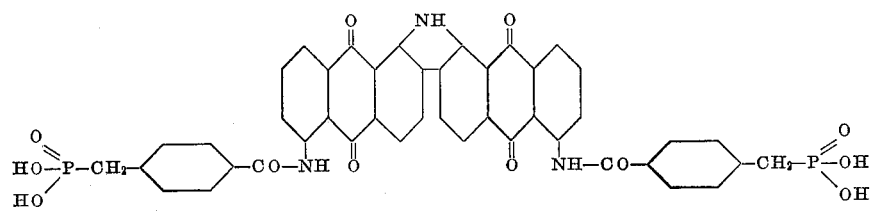

22. In a process for the vat dyeing of cellulosic textile material the improvement which comprises employing as the vat dyestuff the vat dyestuff of the formula

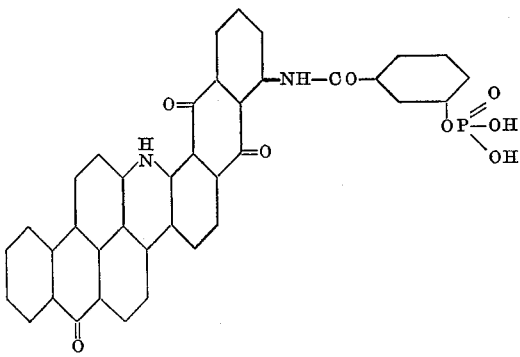

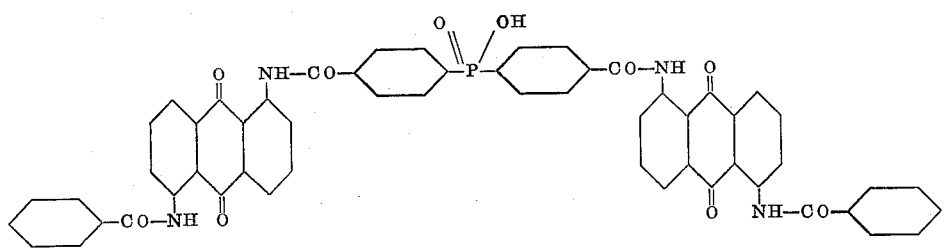

23. In a process for the vat dyeing of cellulosic textile material the improvement which comprises employing as the vat dyestuff the vat dyestuff of the formula

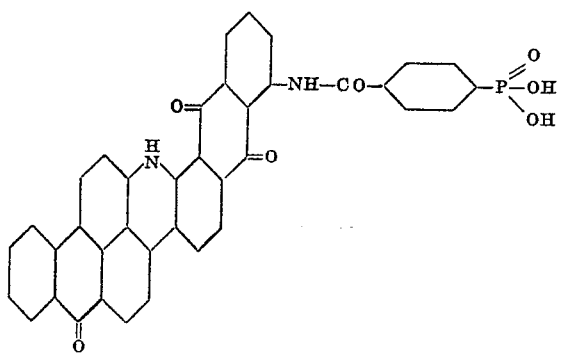

References Cited

UNITED STATES PATENTS

| | | |
|---|---|---|
| 1,801,709 | 4/1931 | Zerwerk _____ 260—274 |
| 1,845,469 | 2/1932 | Wolff et al. _____ 260—274 |
| 2,195,462 | 4/1940 | Krause et al. _____ 260—377 X |
| 2,326,047 | 8/1943 | McNally et al. _____ 260—379 |
| 2,464,831 | 3/1949 | Stilmar _____ 260—307.5 |
| 2,511,019 | 6/1950 | Stilmar _____ 260—307.5 |
| 2,567,821 | 9/1951 | Moergeri _____ 260—377 |
| 2,629,718 | 2/1953 | Belshaw et al. _____ 260—307.5 |
| 2,670,265 | 2/1954 | Heyna et al. _____ 8—49 |
| 2,723,279 | 11/1955 | Hoefle _____ 260—377 |
| 2,768,172 | 10/1956 | Schmidt-Nickels _____ 260—315 |
| 2,983,731 | 5/1961 | Meis et al. _____ 260—315 |
| 3,134,781 | 5/1964 | Wunderlich et al. ____ 260—274 |

FOREIGN PATENTS 570,326   9/1961   Belgium.

NORMAN G. TORCHIN, *Primary Examiner.*

J. HERBERT, D. G. DAUS, *Assistant Examiner.*